(12) United States Patent
Francois et al.

(10) Patent No.: US 8,141,593 B2
(45) Date of Patent: Mar. 27, 2012

(54) SYSTEM FOR TIGHTLY COVERING AN ELONGATE MEMBER WITH AN ELASTIC PROTECTION SLEEVE

(75) Inventors: Pierre Henri Adrien Francois, Bordeaux (FR); Piotr Gorecki, Terrasson la Villedieu (FR); Laurent Chanat, Brive la Gaillarde (FR)

(73) Assignee: Societe Industrielle de Construction d'Appareils et de Materiel Electrique, Arnac Pompadour (FR)

( * ) Notice: Subject to any disclaimer, the term of this patent is extended or adjusted under 35 U.S.C. 154(b) by 409 days.

(21) Appl. No.: 12/368,091

(22) Filed: Feb. 9, 2009

(65) Prior Publication Data
US 2009/0199397 A1 Aug. 13, 2009

(51) Int. Cl.
*F16L 11/00* (2006.01)
(52) U.S. Cl. .................. 138/110; 138/DIG. 3; 174/136; 439/163
(58) Field of Classification Search .................. 138/110, 138/DIG. 3; 439/33, 163, 447, 475; 174/136
See application file for complete search history.

(56) References Cited

U.S. PATENT DOCUMENTS

| | | | | |
|---|---|---|---|---|
| 4,245,674 A | * | 1/1981 | Nakamura et al. | 138/110 |
| 4,367,105 A | * | 1/1983 | Rosier et al. | 156/79 |
| 5,070,597 A | * | 12/1991 | Holt et al. | 29/887 |
| 5,087,492 A | * | 2/1992 | Vallauri et al. | 428/34.9 |
| 5,495,650 A | * | 3/1996 | Crepel et al. | 29/235 |
| 5,735,981 A | * | 4/1998 | Winfield et al. | 156/52 |
| 5,844,170 A | * | 12/1998 | Chor et al. | 174/74 A |
| 7,351,908 B2 | * | 4/2008 | Wentzel et al. | 174/36 |
| 7,767,909 B2 | * | 8/2010 | Krabs et al. | 174/84 R |

FOREIGN PATENT DOCUMENTS

| EP | 0 917 269 | 5/1999 |
|---|---|---|
| FR | 2 791 480 | 9/2000 |

* cited by examiner

*Primary Examiner* — James Hook
(74) *Attorney, Agent, or Firm* — Young & Thompson

(57) ABSTRACT

The system includes, in addition to the sleeve (11), a tubular core (12) for keeping in a stretched condition the sleeve, adapted to receive inside it the elongate member, and a film (13) with a low coefficient of friction placed between the sleeve (11) and the core (12) to enable the core to slide relative to the sleeve. The film (13) extends at least from a first end (15) of the sleeve to a first end (17) of the core (12) opposite the first end (15) of the sleeve, makes a half-turn at the first end (17) of the core (12) and then extends inside the core as far as its second end (18) at which it makes a half-turn and then extends outside the core (12) as far as the sleeve (11) to which it is fixed externally.

20 Claims, 4 Drawing Sheets

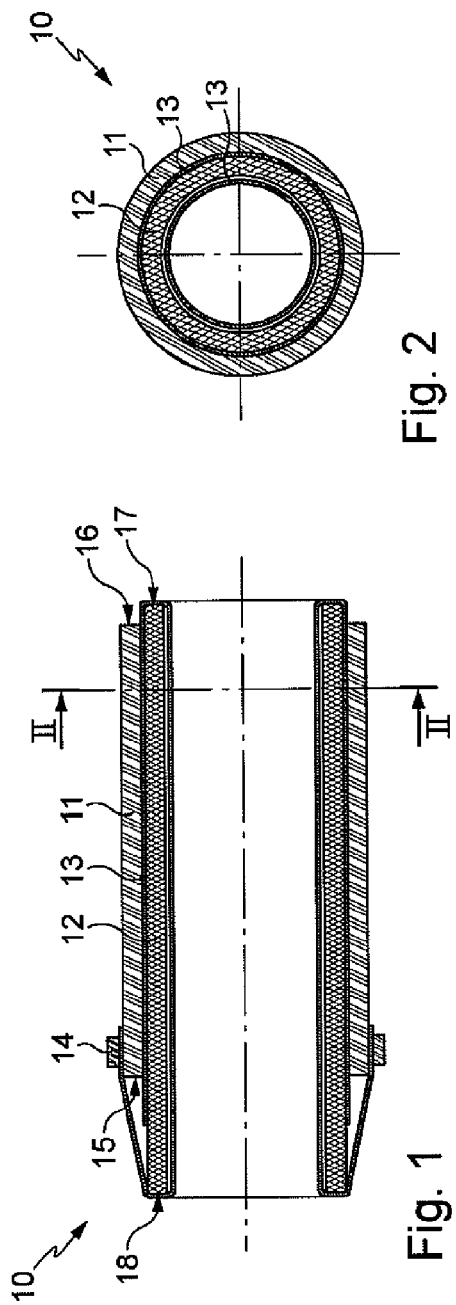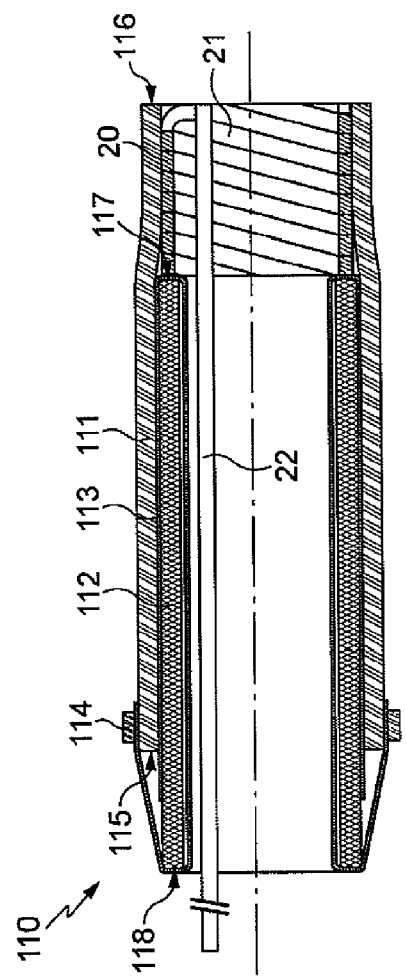

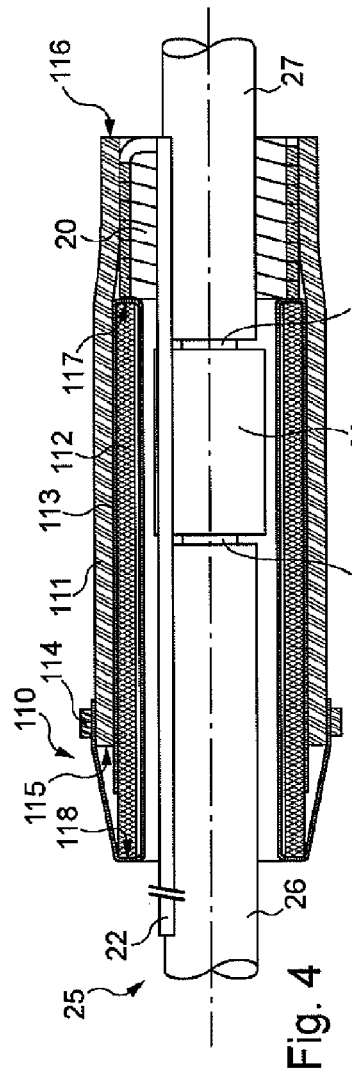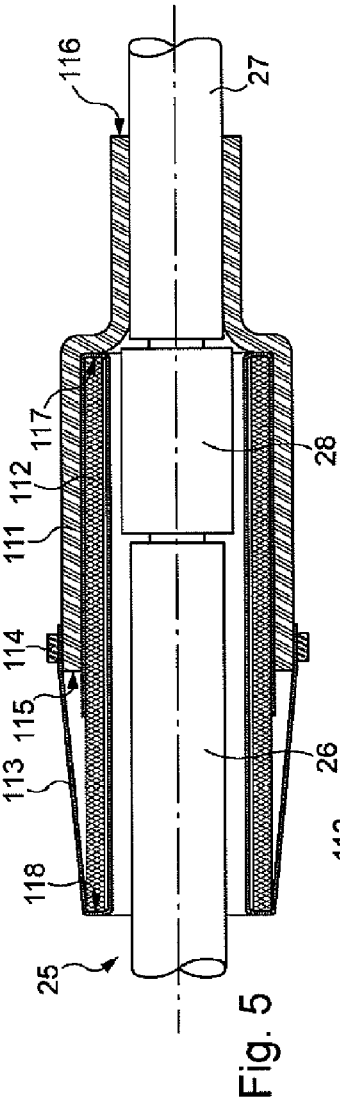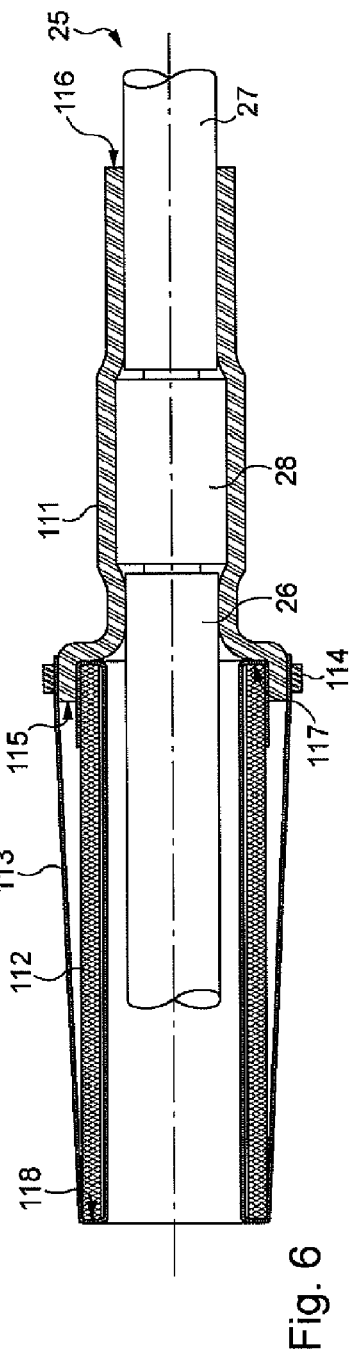

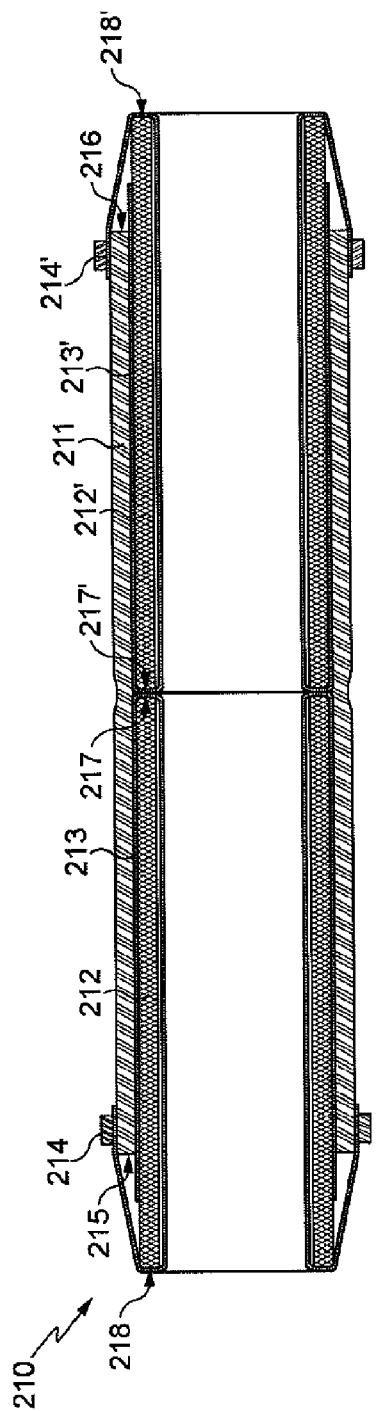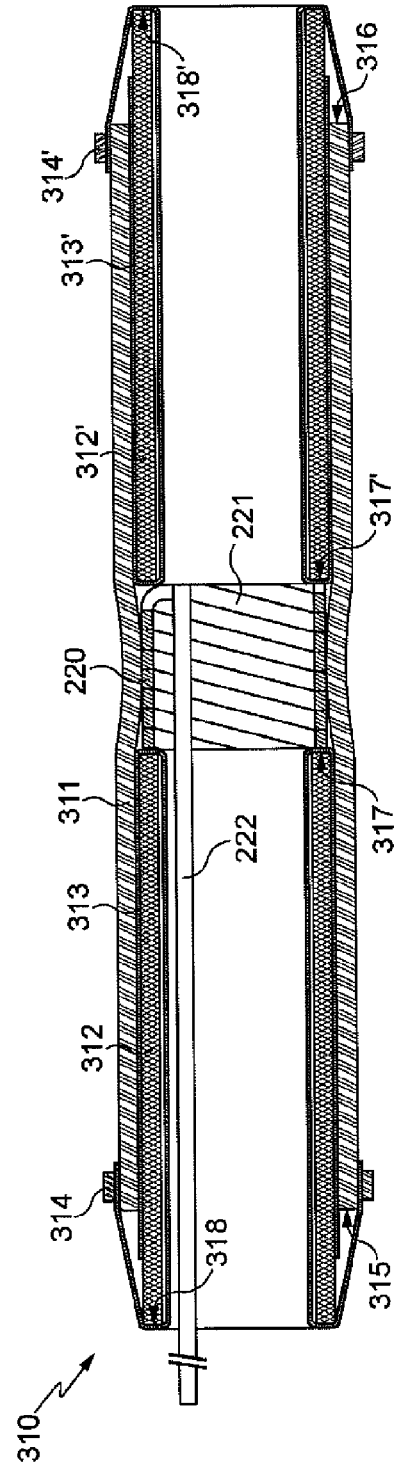

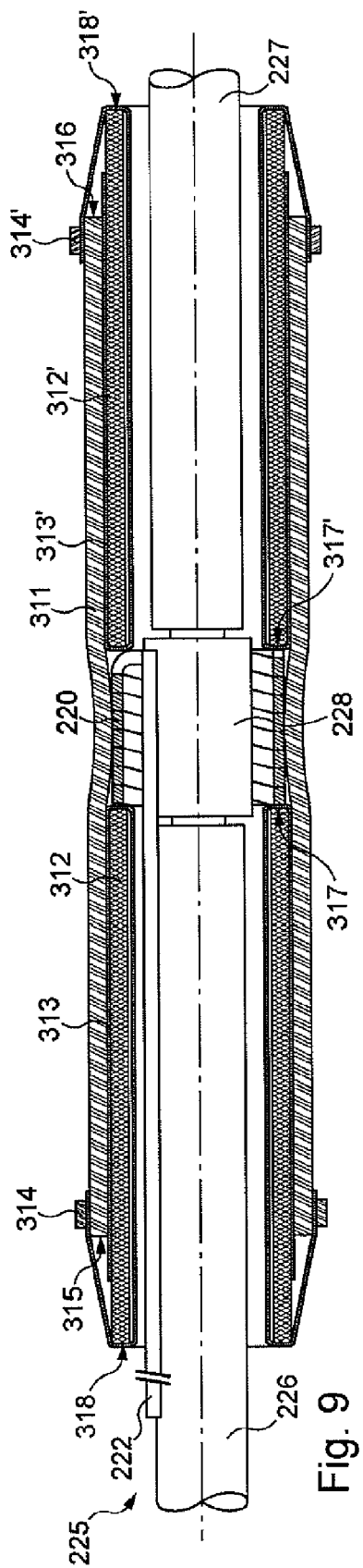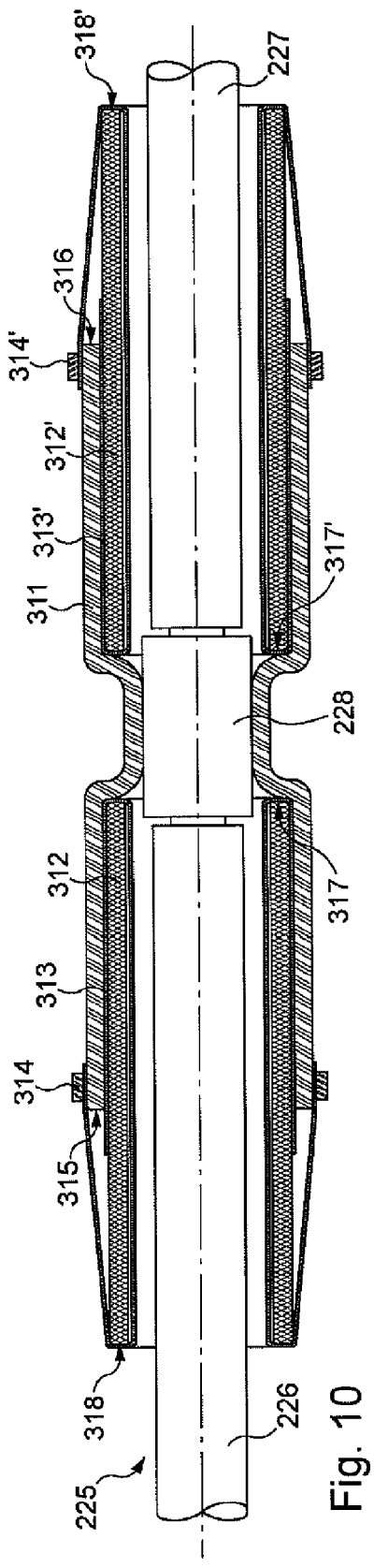

SYSTEM FOR TIGHTLY COVERING AN ELONGATE MEMBER WITH AN ELASTIC PROTECTION SLEEVE

BACKGROUND OF THE INVENTION

1. Field of the Invention

The invention concerns fitting an elastic protection sleeve to an elongate member such as an electrical cable or two electrical cables joined together.

2. Description of the Related Art

There are known already, in particular from French patent application 2 791 480, systems for this purpose including, in addition to the elastic sleeve, a tubular core for keeping in a stretched condition the sleeve, which covers it tightly, the core being adapted to receive inside it the elongate member and then to slide both relative to the elongate member and relative to the elastic sleeve so that the latter tightly covers the elongate member.

To enable the elastic sleeve to slide relative to the tubular core, there is placed between them a film with a low coefficient of friction which extends beyond one end of the sleeve to an end of the core opposite said end of the sleeve, the film making a half-turn at that end of the core, inside which it is connected to an elastic tie fixed to the other end of the core to be tensioned.

This elastic tie assists sliding of the low friction coefficient film relative to the core so that slight manual traction on the core is sufficient to cause the elastic sleeve to slide.

SUMMARY OF THE INVENTION

The invention aims to provide a system of the same kind that is particularly convenient and reliable both in fabrication and in use.

To this end it proposes a system for tightly covering an elongate member of predetermined dimensions with an elastic protection sleeve, including:

said sleeve;

a tubular core for keeping in a stretched condition said sleeve, tightly covered by said sleeve, and adapted to receive inside it said elongate member; and a film with a low coefficient of friction placed between said sleeve and said core to enable said core to slide relative to said sleeve, said film extending at least from one end of the sleeve to a first end of the core opposite said end of the sleeve;

characterized in that the second end of the core is situated beyond said end of the sleeve and in that said low friction coefficient film makes a half-turn at said first end of the core and then extends inside said core as far as its second end at which it makes a half-turn and then extends outside the core as far as said sleeve to which it is fixed externally.

If the elastic sleeve is allowed to contract onto the elongate member beyond the first end of the core, that contraction produces a thrust on the first end of the core, which is then driven in the direction from its first end toward its second end, the driving movement continuing until the core is expelled from the sleeve.

How the low friction coefficient film is placed relative to the core and relative to the sleeve, and in particular how the film is fixed to the sleeve, is such that during expulsion the portion of the film still between the tube and the sleeve does not slide relative to the sleeve.

This prevents, or in any event greatly reduces, the risk of the film becoming creased between the sleeve and the core during expulsion, which could interrupt the expulsion movement, which the operator would then have to complete by action on the core and on the sleeve.

The absence of sliding between the film and the sleeve furthermore offers the advantage of preventing, or in any event greatly reducing, the risk of a portion of the low friction coefficient film becoming torn off and remaining trapped between the elongate member and the elastic sleeve, which would be liable to degrade the protection provided by the elastic sleeve (for example, a portion of film remaining trapped between them like this could degrade the electrical insulation and/or the air-tightness and the water-tightness provided by the elastic sleeve).

The fact that it is the low friction coefficient film itself (and not a tie connected to it) that extends inside the core and then makes a half-turn at the second end thereof and is fixed externally to the sleeve is particularly convenient at the fabrication stage and particularly reliable in use.

According to features preferred as being favorable to correct expulsion of the core by the sleeve, said film is tensioned.

According to features preferred for reasons of simplicity and convenience both at the fabrication stage and in use, the system of the invention includes an elastic ring for fixing said film to the external surface of said sleeve; also, for the film to remain fixed to the sleeve until completion of expulsion of the core, said elastic ring is preferably disposed in the vicinity of said first end of said sleeve.

In a first embodiment that is preferred as being particularly simple, said first end of said core is located beyond the second end of said sleeve.

In other embodiments, the system of the invention includes a frangible ring disposed in line with said core and also tightened by said sleeve.

This kind of ring provides a particularly convenient way of starting contraction of the sleeve onto the elongate member.

In an embodiment that is preferred if the sleeve must be short, said frangible ring has a length corresponding to the distance between said first end of said core and the second end of said sleeve.

In other embodiments preferred when the sleeve must be relatively long, the system of the invention includes two of said cores.

In a first embodiment that is particularly simple, said first end of a first of said cores is disposed against said first end of a second of said cores.

In a second embodiment, which is particularly convenient for starting contraction of the sleeve onto the elongate member, the system of the invention includes a frangible ring forming a spacer between the first end of a first of said cores and the first end of a second of said cores.

BRIEF DESCRIPTION OF THE DRAWING FIGURES

The description of the invention now continues with a detailed description of embodiments, provided hereinafter by way of nonlimiting illustration, and with reference to the appended drawings. In the drawings:

FIG. 1 is a view in longitudinal section of a first embodiment of the system of the invention;

FIG. 2 is a view in cross section taken along the line II-II in FIG. 1;

FIG. 3 is a view similar to FIG. 1 for a second embodiment of the system of the invention;

FIG. 4 is a view similar to FIG. 3, but with an elongate member to be covered placed inside the system;

FIGS. 5 and 6 are similar views showing the core of the system during expulsion by the sleeve;

FIGS. 7 and 8 are views similar to FIG. 1, respectively showing third and fourth embodiments of the system of the invention;

FIG. 9 is a view similar to FIG. 8 with an elongate member to be covered in place in the system; and FIG. 10 is a view similar to FIG. 9 showing the cores of the system being expelled by the sleeve.

DETAILED DESCRIPTION OF THE INVENTION

The system 10 shown in FIG. 1 includes n elastic protection sleeve 11, a tubular core 12, a film 13 with a low coefficient of friction, and an elastic ring 14 tightening the film 13 onto the external surface of the sleeve 11 in order to fix it thereto.

The sleeve 11 is designed to cover tightly an elongate member such as a section of electrical cable or two sections of electrical cable in order to provide electrical insulation, air-tightness and water-tightness, as shown in FIG. 6 for the similar sleeve 11.

The tubular core 12 keeps the sleeve 11 in a stretched condition, i.e. in a condition in which it is expanded radially relative to the condition that it adopts in the absence of external loads. The core 12 is therefore tightly covered by the sleeve 11. The space inside the core 12 is adapted to receive inside it the elongate member that is to be covered by the protection sleeve 11.

The low friction coefficient film 13 is placed between the sleeve 11 and the core 12 to enable them to slide relative to each other.

The core 12 can therefore slide both relative to the elongate member placed therein and relative to the sleeve 11, so that the latter comes to cover tightly the elongate member, as explained in more detail below.

The core 12 extends beyond each of the ends 15 and 16 of the sleeve 11. The end 17 of the core 12 is relatively close to the corresponding end 16 of the sleeve 11 while the other end 18 of the core 12 is relatively far from the corresponding end 15 of the sleeve 11.

The proximity of the ends 16 and 17 has the benefit of providing a simple and convenient way to start the extraction of the core 12, which is to be implemented with the core 12 being driven relative to the sleeve 11 in the direction from the end 17 toward the end 18, as explained in more detail below.

The film 13 is placed between the elastic sleeve 11 and the core 12 over the whole length of the sleeve 11, i.e. between its ends 15 and 16. The film 13 extends slightly beyond the end 15. At the other end of the sleeve 11, the film 13 extends beyond the end 16 until it makes a half-turn over the end 17 of the sleeve 12 situated at the same side as the end 16, and then extends inside the core 12 to its other end 18, over which it makes a half-turn, after which it extends on the outside of the core 12 as far as the sleeve 11, to which it is fixed externally by the elastic ring 14.

The system 110 shown in FIG. 3 is described next, and then, with reference to FIGS. 4 to 6, how the sleeve 111 that includes the system 110 is placed over an elongate member. How the sleeve 11 of the system 10 is fitted is then explained.

Generally speaking, the same reference numbers have been used for the system 110 as for the system 10, increased by 100.

In the system 110, the core 112, the film 113 and the elastic ring 114 are identical to the core 12, the film 13 and the ring 14, respectively.

The sleeve 111 differs from the sleeve 11 only in that it is longer.

In addition to the sleeve 111, the core 112, the film 113 and the ring 114, the system 110 includes a frangible ring 20 having substantially the same shape in section as the core 112 and disposed in line with the latter.

The core 112 extends beyond the end 115 of the sleeve 111 in the same way that the core 12 extends beyond the end 15 of the sleeve 11, the end 118 of the core 112 being relatively far away from the end 115 of the sleeve 111.

Whereas in the system 10 the end 16 of the sleeve 11 is set back relative to the end 17 of the core 12, the end 116 of the sleeve 111 is situated beyond the end 117 of the core 112.

The sleeve 111 covers not only the core 112 but also the frangible ring 20, the length whereof corresponds to the distance between the end 117 of the core 112 and the end 116 of the sleeve 111.

The film 113 is placed between the sleeve 111 and the core 112 over the whole of the length over which they are in contact, i.e. between the end 115 of the sleeve 111 and the end 117 of the core 112.

The disposition of the film 113 relative to the core 112 and the sleeve 111 between the end 117 and the ring 114 is exactly the same as the disposition of the film 13 between the end 17 and the ring 14: the film 113 makes a half-turn over the end 117 and then extends inside the core 112 as far as the end 118, over which it makes a half-turn, and then extends on the outside of the core 112 as far as the sleeve 111, to which it is fixed externally by the elastic ring 114.

The ring 20 is formed by a helical winding of a strip 21 whose edges are joined together in a manner adapted to be torn, one end of the strip 21 being at the end of the ring 20 that is against the core 112 (the end of the ring 20 that is seen on the left in FIG. 3), while at the other end of the ring 20 (the end seen on the right in FIG. 3), the strip 21 departs from the helical winding and extends longitudinally in the form of a strap 22 inside the ring 20 and then inside the core 112 until it projects from the end 118.

Applying traction to the end of the strap 22 that projects from the core 112 progressively unwinds the winding that forms the ring 20, from the end seen on the right in FIG. 3 until it is completely unwound.

The ring 20 can therefore be entirely removed from the system 110, including if an elongate member is disposed inside the core 112 and the ring 20, as FIG. 4 shows.

In practice, the ring 20 is formed from a pre-existing strip whose edges are lightly welded or the ring 20 is made from a tube on which a helical pre-cutting line is formed, the strap 22 being in one piece with the tube or attached to the material of the tube.

The core 12 is placed in the sleeve 11 or the core 112 and the ring 20 are placed in the sleeve 111 in the conventional way, for example as described in French patent application 2 786 954, with the portion of the film 13 or 113 adapted to extend between the end 18 or 118 and the ring 14 or 114, which is then free.

When the sleeve 11 or 111 has been fitted, the film 13 or 113 is turned over the end 18 or 118 and fixed to the sleeve 11 or 111 by the elastic ring 14 or 114.

To prevent any creases liable to compromise sliding of the core 12 or 112 relative to the sleeve 11 or 111, the film 13 or 113 is preferably tensioned at this point.

To prevent expulsion of the core 12 during storage or transportation, the system 10 also includes removable means (not shown) for immobilizing the sleeve 11 relative to the core 12 for example a rivet and/or a hook and loop tape.

The ring 20 of the system 110 ensures some degree of immobilization of the sleeve 111 relative to the core 112. Depending on the storage and transportation circumstances, the system 110 is provided with complementary immobilizing means, such as a rivet and/or a hook and loop tape, or not.

FIG. 4 represents an elongate member 25 inserted into the core 112 and into the ring 20.

The member 25 is formed of two electrical cables 26 and 27 disposed end-to-end and of a splicing member 28 placed on bared end sections 29 and 30 of the cable 26 and the cable 27, respectively.

In the example shown, the cables 26 and 27 have no other accessible end sections with the result that one of the cables 26 and 27 was inserted into the device 110 first, the splicing member 28 was then fitted, and the device 110 was then positioned as shown in FIG. 4, i.e. with the sleeve 111 positioned longitudinally relative to the elongate member 25 at the location it is to adopt on that member.

For the sleeve 111 to cover the member 25, the end of the strap 22 that projects from the core 112 is pulled to unwind the ring 20 and extract it completely.

This enables the sleeve 111 to contract onto the elongate member 25 beyond the end 117 of the core 112, this contraction producing a thrust on the end 117 in reaction to which the core 112 is driven in the direction from the end 117 toward the end 118, as shown in FIGS. 5 and 6, the driving movement continuing until the core 112 is expelled entirely from the sleeve 111.

The sleeve then tightly covers the elongate member 25, providing electrical insulation, air-tightness and water-tightness therefore at and on either side of the splicing member 28.

Comparing FIGS. 4, 5 and 6 shows that during expulsion of the core 112 the portion of the film 113 sandwiched between the sleeve 111 and the core 112 does not slide relative to the sleeve 111 and furthermore that the fixing of the film 113 to the sleeve 111 by the ring 114 guarantees that such sliding movement cannot take place.

The core 112 is therefore expelled smoothly and in a regular manner and the risk of a portion of the film 113 being torn off and remaining between the member 25 and the sleeve 111 is eliminated or at least greatly reduced. This is particularly advantageous if the elongate member 25 is formed, as in the example shown, of electrical cables, a fragment of film being liable to degrade the electrical insulation and the seal provided by the sleeve 111.

As is clearer in FIG. 6, using an elastic ring 114 to fix the film 113 to the sleeve 111, placing the ring 114 near the end 115 of the sleeve 111, offers the advantage of automatically releasing the film at the end of expulsion of the core 112, the contraction of the portion of the sleeve 111 situated near the end 115 eliminating or in any event greatly reducing the banding effect produced by the ring 114, the latter and the film 113 being released from the sleeve 111 at this point.

Use of the system 10 (FIGS. 1 and 2) on an elongate member 25 is similar to use of the system 110, the only difference being that the operation that enables the sleeve 11 to contract onto the elongate member beyond the end 17 of the core 12 is not the tearing of the ring 20 but sliding of the core 12 relative to the sleeve 11 in the direction from the end 17 toward the end 18.

To facilitate the task of the operator having to slide the core 12 relative to the sleeve 11 in this way, in a variant of the system 10 that is not shown the film 13, rather than being present over the whole of the inside perimeter of the core 12, is divided between the end 17 and the end 18 into two sections each of which contracts to form a relatively narrow strip, each of the two strips making a half-turn at the end 18 and being fixed to the sleeve 11 by the elastic ring 14.

The space between the two strips gives direct access to the core 12 and enables it to be gripped, for example between the fingers of one hand while the other hand grasps the sleeve 11.

To facilitate further the task of the user, a more sophisticated variant of the system 10 has, in the core 12, between the strips of film, near the end 18, one or more holes for inserting a hook for pulling on the core 12.

It will be noted that it is also beneficial, in the system 110, for the film 113 to be divided into two strips between the ends 117 and 118, in particular to facilitate fabrication of the system 110, manipulation of two strips being easier than manipulation of a tubular portion.

The system 210 shown in FIG. 7 is described next. Generally speaking, the same reference numbers are used as for the system 10, increased by 200.

In the system 210, the core 212, the film 213 and the elastic ring 214 are identical to the core 12, the film 13 and the ring 14, respectively.

The sleeve 211 differs from the sleeve 11 only in that it is substantially twice as long.

The system 210 further includes a second tubular core 212', a second film 213' with a low coefficient of friction and a second elastic ring 214' identical to the core 212, the film 213 and the ring 214, respectively.

The core 212 extends beyond the end 215 of the sleeve 211 in the same way as the core 12 extends beyond the end 15 of the sleeve 11, the end 218 of the core 212 being relatively far away from the end 215 of the sleeve 211.

The core 212' also extends beyond the end 216 of the sleeve 211 in the same manner as the core 12 extends beyond the end 15 of the sleeve 11, the end 218' of the core 212' being relatively far from the end 216 of the sleeve 211.

The end 217 of the sleeve 212 and the end 217' of the sleeve 212' are located more or less at the center of the sleeve 211, one against the other.

Generally speaking, the arrangement of the sleeve 212', the film 213' and the elastic ring 214' is the mirror image of the arrangement of the core 212, the film 213 and the ring 214.

The following description in respect of the core 212, the film 213 and the ring 214 is equally valid for the core 212', the film 213' and the ring 214' subject to adding a "prime" symbol to their reference numbers and substituting the end 216 of the sleeve 211 for the end 215.

The film 213 is placed between the sleeve 211 and the core 212 over the whole of the length in which they are in contact, i.e. between the end 215 of the sleeve 211 and the end 217 of the core 212.

The disposition of the film 213 relative to the core 212 and the sleeve 211 between the end 217 and the ring 214 is exactly the same as the disposition of the film 13 between the end 17 and the ring 14: the film 213 makes a half-turn over the end 217 and then extends inside the core 212 as far as the end 218, over which it makes a half-turn, after which it extends outside the core 212 as far as the sleeve 211 to which it is fixed by the elastic ring 214.

The system 310 shown in FIG. 8 is described next, and then, with reference to FIGS. 9 and 10, how the sleeve 311 of the system 310 is fitted to an elongate member. How the sleeve 211 of the system 210 is fitted is then explained.

Generally speaking, the same reference numbers are used for the system 310 as for the system 210, increased by 100.

In the system 310, the cores 312 and 312', the films 313 and 313' and the elastic rings 114 and 114' are identical to the cores 212 and 212', the films 213 and 213 and the rings 214 and 214', respectively.

The sleeve 311 differs from the sleeve 211 only in that it is longer.

In addition to the sleeve 311, the cores 312 and 312', the films 313 and 313' and the rings 314 and 314', the system 310 includes a frangible ring 220 having a cross section of substantially the same shape as the cores 312 and 312' between and in line with which it is disposed in the manner of a spacer.

Generally speaking, the description given hereinabove for the ring 20 is valid for the ring 220 subject to adding 200 to the reference numbers 20, 21 and 22.

The description given hereinabove for the arrangement of the core 112 relative to the sleeve 111 and the ring 20 and for the arrangement of the film 113 relative to the sleeve 111, the core 112 and the ring 114 is equally valid for the arrangement of the core 312 relative to the sleeve 311 and the ring 220 and for the arrangement of the film 313 relative to the sleeve 311 and the core 312, subject to adding 200 to the reference numbers of that description.

Similarly, the description given hereinabove for the arrangement of the core 112, the film 113 and the ring 114 relative to each other and relative to the sleeve 111 is valid for the arrangement of the core 312', the film 313' and the ring 314' relative to each other and relative to the sleeve 311 subject to adding 200 and a "prime" symbol to the reference numbers of that description, except for the sleeve 311, and substituting the end 316 of the sleeve 311 for the end 115 of the sleeve 111.

FIG. 9 represents an elongate member 225 inserted in the core 312, the ring 220 and the core 312'.

The description given hereinabove for the member 25 is equally valid for the member 225 subject to adding 200 to the reference numbers.

For the sleeve 311 to cover the member 225, the end of the strap 222 that projects from the core 312 is pulled to unwind the ring 220 and extract it completely.

As shown in FIG. 10, this enables the sleeve 311 to contract onto the elongate member 225 beyond the end 317 of the core 312 and the end 317' of the core 312', this contraction pushing on each of the ends 117 and 117' in reaction to which the cores 112 and 112' are driven in the direction from the end 117 toward the end 118 and from the end 117' toward the end 11, respectively, the driving movement continuing until the cores 112 and 112' are expelled completely from the sleeve 311.

The latter then tightly covers the elongate member 225, for which it provides electrical insulation, air-tightness and water-tightness at and on either side of the splicing member 228.

The description given above of the expulsion of the core 112 is equally valid for the cores 312 and 312' subject to adding 200 to the reference numbers of that description for the core 312 and for the core 312', adding 200 and a "prime" symbol, as well as substituting the end 316 of the sleeve 311 for the end 115 of the sleeve 111.

Use of the system 210 (FIG. 7) on an elongate member 25 or 225 is similar to use of the system 310, the only difference being that the operation that enables the sleeve 211 to contract onto the elongate member beyond the end 217 of the core 212 and/or beyond the end 217' of the core 212' is not the tearing of the ring 220 but sliding of the core 212 and/or 212' relative to the sleeve 211 in the direction from the end 217 toward the end 218 and in the direction from the end 217' toward the end 218', respectively.

To facilitate the task of the operator having to slide the core 212 and/or the core 212' in this way relative to the sleeve 211, in a variant that is not shown the film 213 and/or the film 213' is divided into two strips, as explained above for the system 10.

In will be noted that it is equally beneficial, in the system 310, to divide the film 313 and/or the film 313' into two strips.

In a variant that is not shown, the low friction coefficient film 13, 113, 213, 213', 313 and 313' is fixed to the sleeve 11, 111, 211 and 311 other than by an elastic ring 14, 114, 214, 214', 314 and 314', for example by gluing it.

In other variants that are not shown, the dimensions and the conformation of the sleeve 11, 111, 211 and 311, the core 12, 112, 212, 212', 312 and 312', the film 13, 113, 213, 213', 313 and 313', the elastic ring 14, 114, 214, 214', 314 and 314' and the frangible ring 20 and 220 are different, for example the elastic sleeve has on the outside globally frustoconical fins when it is placed on an elongate member such as 25 and 225.

Numerous other variants are possible as a function of circumstances, and in this regard it is pointed out that the invention is not limited to the examples described and shown.

The invention claimed is:

1. A system for tightly covering an elongate member (25; 225) of predetermined dimensions with an elastic protection sleeve (11; 111; 211; 311), comprising:
   said sleeve (11; 111; 211; 311);
   a tubular core (12; 112; 212; 212'; 312, 312') for keeping in an elastically stretched condition said sleeve (11; 111; 211; 311) tightly covered by said sleeve, and adapted to receive inside said sleeve said elongate member (25; 225); and
   a film (13; 113; 213, 213'; 313, 313') with a low coefficient of friction placed between said sleeve (11; 111; 211; 311) and said core (12; 112; 212, 212'; 312, 312') to enable said core to slide relative to said sleeve, said film extending at least from one end (15; 115; 215, 216; 315, 316) of the sleeve to a first end (17; 117; 217, 217'; 317, 317') of the core opposite said end of the sleeve;
   wherein a second end (18; 118; 218, 218'; 318, 318') of the core (12; 112; 212, 212'; 312, 312') is situated beyond said end (15; 115; 215, 216; 315, 316) of the sleeve (11; 111; 211; 311), and said low friction coefficient film (13; 113; 213; 213'; 313, 313') makes a half-turn at said first end (17; 117; 217, 217'; 317, 317') of the core (12; 112; 212, 212'; 312, 312') and then extends inside said core as far as its second end (18; 118; 218, 218'; 318, 318') at which said film makes a half-turn and then extends outside the core as far as said sleeve (11; 111; 211; 311) to which said film is fixed externally.

2. The system according to claim 1, wherein said film (13; 113; 213, 213'; 313, 313') is tensioned.

3. The system according to claim 1, wherein the system includes an elastic ring (14; 114; 214, 214'; 314, 314') for fixing said film (13; 113; 213, 213'; 313, 313') to an external surface of said sleeve (11; 111; 211; 311).

4. The system according to claim 3, wherein said elastic ring (14; 114; 214, 214'; 314, 314') is disposed in a vicinity of said first end (15; 115; 215, 216; 315, 316) of said sleeve (11; 111; 211; 311).

5. The system according to claim 1, wherein said first end (17) of said core (12) is located beyond the second end (16) of said sleeve (11).

6. The system according to claim 1, wherein the system includes a frangible ring (20; 220) disposed in line with said core (12; 312, 312') and also tightened by said sleeve (11; 311).

7. The system according to claim 6, wherein said frangible ring (20) has a length corresponding to the distance between said first end (117) of said core (112) and the second end (116) of said sleeve (111).

8. The system according to claim 1, wherein the system includes two of said cores (212, 212'; 312, 312').

9. The system according to claim 8, wherein said first end (217) of a first of said cores (212) is disposed against said first end (217') of a second of said cores (212).

10. The system according to claim 8, wherein the system includes a frangible ring (220) forming a spacer between the first end (317) of a first of said cores (312) and the first end (317') of a second of said cores (312').

11. A system for tightly covering an elongate member of predetermined dimensions formed from at least one electrical cable, with an elastic protection sleeve, comprising:
- said sleeve;
- a tubular core configured for keeping in an elastically stretched condition said sleeve tightly covered by said sleeve, and adapted to receive inside said sleeve said elongate member; and
- a film with a low coefficient of friction placed between said sleeve and said core to enable said core to slide relative to said sleeve, said film extending at least from one end of the sleeve to a first end of the core opposite said end of the sleeve;
- wherein a second end of the core is situated beyond said end of the, and said low friction coefficient film makes a half-turn at said first end of the core and then extends inside said core as far as its second end at which said film makes a half-turn and then extends outside the core as far as said sleeve to which said film is fixed externally.

12. The system according to claim 11, wherein said film is tensioned.

13. The system according to claim 11, wherein the system includes an elastic ring for fixing said film to an external surface of said sleeve.

14. The system according to claim 13, wherein said elastic ring is disposed in a vicinity of said first end of said sleeve.

15. The system according to claim 11, wherein said first end of said core is located beyond the second end of said sleeve.

16. The system according to claim 11, wherein the system includes a frangible ring disposed in line with said core and also tightened by said sleeve.

17. The system according to claim 16, wherein said frangible ring has a length corresponding to the distance between said first end of said core and the second end of said sleeve.

18. The system according to claim 11, wherein the system includes two of said cores.

19. The system according to claim 18, wherein said first end of a first of said cores is disposed against said first end of a second of said cores.

20. The system according to claim 18, wherein the system includes a frangible ring forming a spacer between the first end of a first of said cores and the first end of a second of said cores.

* * * * *